United States Patent [19]

Nagata et al.

[11] Patent Number: 4,933,155

[45] Date of Patent: Jun. 12, 1990

[54] METHOD OF PRODUCING POWDER OF LITHIUM ZIRCONATE

[75] Inventors: Hiroya Nagata; Hiroshi Yamamura, both of Yokohama, Japan

[73] Assignee: Tosoh Corporation, Yamaguchi, Japan

[21] Appl. No.: 317,654

[22] Filed: Mar. 1, 1989

[30] Foreign Application Priority Data

Mar. 11, 1988 [JP] Japan .................................. 63-55977

[51] Int. Cl.⁵ ........................ C01G 25/00; C01D 15/00
[52] U.S. Cl. .................................. 423/593; 423/608; 423/641; 423/71
[58] Field of Search ................. 423/593, 608, 641, 71; 252/315.01; 156/DIG. 108; 502/349

[56] References Cited

FOREIGN PATENT DOCUMENTS 1122380 8/1968 United Kingdom ................ 423/593
1212347 11/1970 United Kingdom ................ 423/593

Primary Examiner—Robert L. Stoll
Assistant Examiner—Steven J. Bos
Attorney, Agent, or Firm—Nixon & Vanderhye

[57] ABSTRACT

A method of producing powder of lithium zirconate is disclosed, in which a gel-like zirconium compound obtained by hydrolyzing or neutralizing an aqueous solution of a zirconium salt is mixed with an aqueous solution of a lithium salt and the mixture is dehydrated, temporarily burned and pulverized.

11 Claims, No Drawings

METHOD OF PRODUCING POWDER OF LITHIUM ZIRCONATE

BACKGROUND OF THE INVENTION

The present invention relates to a method of producing powder of lithium zirconate ($Li_2ZrO_3$) useful as an intermediate for producing sintered articles etc. of lithium zirconate, which are the most promising candidates for the tritium breeding materials used for the blanket of a nuclear fusion reactor.

A method of producing the powder to make the sintered article of lithium zirconate is known, wherein a solid-phase reaction as shown by the following equation is performed through a temporary burning of the mixture of lithium carbonate and zirconium oxide.

$$Li_2CO_3 + ZrO_2 \rightarrow Li_2ZrO_3 + CO_2 \uparrow$$

With this method, however, it is difficult to obtain a homogeneous powder since the reaction tends to become nonuniform. The inhomogeneous powder is poor in sinterability, making it difficult to obtain a high-quality sintered article.

On the other hand, as a means to produce homogeneous and fine-particulate powder, it is known to burn a gel obtainable by the sol-gel method or the coprecipitation method. However, is well known, it is very difficult to allow the lithium compounds to precipitate as the gels.

SUMMARY OF THE INVENTION

The inventors have succeeded in obtaining a homogeneous and high-sinterable powder of lithium zirconate by mixing a gel-like zirconium compound obtained by hydrolyzing or neutralizing an aqueous solution of zirconium salt with an aqueous solution of a lithium salt and by dehydrating, temporarily burning and pulverizing the mixture.

DETAILED DESCRIPTION OF THE INVENTION

The following is a detailed description of preferred aspects of the invention.

The gel-like zirconium compound to be used for the production of the powder of lithium zirconate can be obtained by filtering and washing with water the white powder obtainable by boiling aqueous solutions of zirconyl chloride, zirconium chloride, zirconium nitrate, etc. to hydrolyze or neutralizing them with aqueous ammonia etc.

With respect to the aqueous solutions of lithium salts being raw materials, since the higher the concentration in terms of lithium, the easier the dehydration, it is desirable to use lithium salts such as lithium chloride, lithium nitrate, etc. being high in solubility. Of course, the use must be avoided of such materials that contain elements except lithium and oxygen, the elements being not volatized completely through the temporary burning, since the objective is to obtain after the temporary burning, lithium zirconate represented by $Li_2ZrO_3$. For example, lithium salts of organic acids cannot be said to be desirable raw materials since traces of carbon remain after the temporary burning. The mixing ratio of the aqueous solution of lithium salt to the gel-like zirconium compound is desirably 2.1-2.4:1 in terms of Li:Zr gram atomic ratio, that is, higher than the stoichiometric composition of 2:1. This is because the volatization of lithium oxide cannot be avoided at the time of temporary burning and, if making the ratio too high, an action to rather promote the volatization thereof should be taken.

First, the gel-like zirconium compound is added to the aqueous solution of lithium salt and the mixture is stirred, desirably for 15 to 20 hours to mix sufficiently. Next, dehydration is desirably achieved by adding alcohols such as n-butanol, octanol, etc. and removing the water by azeotropy. The temporary burning may usually be performed by keeping at 900° to 1100° C. for 1 to 6 hours in air. The desirable Li:Zr ratio for the raw materials depends on these burning conditions and the structure of the reaction vessel. For example, when the Li:Zr gram atomic ratio is near 2.1:1, the reaction vessel may be structured doubly to suppress the volatization of lithium oxide. The coarse powder obtained through the temporary burning is finally pulverized by the use of a ball mill etc. to obtain the desired powder of lithium zirconate.

The powder obtained as above is molded with a metal mold press, rubber press or the like, and the molded article is buried in the powder and kept at 1200° to 1550° C. for 0.5 to 4 hours in the air, to thereby obtain the sintered article.

It cannot be said that the tritium breeding material is better as the relative density becomes higher and a range of, for example, 84 to 86% is sometimes said to be good. Upon sintering the powder of lithium zirconate of the invention, it is possible to obtain the sintered article with a desired density not confined to the range by controlling the sintering temperature etc.

When producing the powder of lithium zirconate, it is very important to uniformly mix the raw materials. Since the gel-like zirconium compound has a very large surface area and has a property to well adsorb the ions of alkali metals, it is assumed that the lithium ions in the aqueous solution used for the immersion are easily adsorbed by the gel to be dispersed uniformly in the gel. Because of this uniformity, both the powder of lithium zirconate finally obtainable and the sintered article producible from this powder are considered to become uniform in composition. If $Li_2O$ and $ZrO_2$ exist locally in excess relative to $Li_2ZrO_3$ ($Li_2O.ZrO_2$) in the sintered article, the thermal properties such as thermal expansivity etc. become partially unstable and there arises a risk of cracking upon heating or cooling. With the sintered article producible from the powder obtainable according to the invention, there is no such risk because of the uniform composition.

Moreover, when formulating the raw materials at a ratio of stoichiometric composition, the lithium fraction is volatized during the temporary burning and the zirconium fraction having become excess forms monoclinic zirconia. However, when adding the lithium fraction in excess at the time of the formulation of raw materials, it is assumed that lithium oxide is vaporized at the time of the temporary burning and the mixture of raw materials is exposed to this to suppress the evaporation of additional lithium fraction, thereby making possible the production of single component lithium zirconate.

EXAMPLE

Powder of commercial zirconyl chloride anhydride was dissolved at the rate of 300 g to 1 liter of water. To this was added aqueous ammonia to adjust the pH to 7 and to produce the precipitates of gel-like zirconyl hydroxide hydrate, which were filtered and washed with water. Powder of commercial lithium carbonate containing 2.2 gram atoms of lithium per 1 gram atom of zirconium in the precipitates was dissolved in nitric acid and excess nitric acid was neutralized with aqueous ammonia to adjust the pH to 7 and to prepare an aqueous solution of lithium nitrate. The precipitates washed with water were immersed into the aqueous solution of lithium nitrate, which was stirred for 15 hours. Next, n-butanol was added to dehydrate under azeotropy and to dry. This was temporarily burned in a reaction vessel structured doubly by keeping at 1000° C. for 4 hours in the air. The temporarily burned product thus obtained was pulverized for 24 hours in a ball mill using ethanol as a solvent and dried to obtain the powder. This powder was identified by means of X-ray diffraction to be single component lithium zirconate.

Part of this powder was molded into a pellet with a diameter of 15 mm and a thickness of 10 mm under a pressure of 2 tons/cm$^2$. This was buried in part of remaining powder and allowed to sinter by keeping at temperatures shown in following table for 1 hour in the air. As a result, homogeneous white sintered articles with a relative density of 75 to 90% of the theoretical density were obtained as shown in the following table. These sintered articles were also identified by means of X-ray diffraction to be single component lithium zirconate.

| Sintering temperature °C. | Relative sintered density % |
|---|---|
| 1250 | 75 |
| 1400 | 80 |
| 1500 | 90 |

What is claimed is:

1. A method of producing a powder of lithium zirconate, said method comprising the steps of:
   mixing an aqueous solution of a lithium salt with a zirconium compound gel obtained by hydrolyzing an aqueous solution of a zirconium salt to produce a mixture; and
   dehydrating said mixture, temporarily burning said mixture in air at 900° to 1100° C. for about 1 to 6 hours to produce a powder of lithium zirconate and pulverizing said powder.

2. A method according to claim 1, wherein said zirconium compound gel is obtained by boiling an aqueous solution of a zirconium salt selected from the group consisting of zirconyl chloride, zirconium chloride, zirconyl chloride anhydride and zirconium nitrate to produce a white powder followed by filtering and washing said white powder with water.

3. A method according to claim 1, wherein said zirconium compound gel is zirconyl hydroxide hydrate.

4. A method according to claim 1, wherein said lithium salt is selected from the group consisting of lithium chloride and lithium nitrate.

5. A method according to claim 1, wherein the quantitative ratio of aqueous solution of said lithium salt to said zirconium compound gel is 2.1–2.4:1 in terms of Li:Zr gram atomic ratio.

6. A method of producing a powder of lithium zirconate, said method comprising the steps of:
   mixing an aqueous solution of a lithium salt with a zirconium compound gel obtained by neutralizing an aqueous solution of zirconium salt to produce a mixture; and
   dehydrating said mixture, temporarily burning said mixture by heating said mixture in air at 900° to 1100° C. for about 1 to 6 hours to produce a powder of lithium zirconate and pulverizing said powder.

7. A method according to claim 6, wherein said neutralizing is carried out using aqueous ammonia.

8. A method according to claim 6, wherein said zirconium salt is selected from the group consisting of zirconyl chloride, ziconium chloride, zirconyl chloride anhydride and zirconium nitrate.

9. A method according to claim 6, wherein said zirconium compound gel is zirconyl hydroxide hydrate.

10. A method according to claim 6, wherein said lithium salt is selected from the group consisting of lithium chloride and lithium nitrate.

11. A method according to claim 6, wherein said quantitative ratio of aqueous solution of said lithium salt to said zirconium gel is 2.1–2.4:1 in terms of Li:Zr gram atomic ratio.

* * * * *